Nov. 27, 1923.                                                                1,475,896
C. L. STEINERT
MEANS FOR PROMOTING RETAIL CREDIT
Filed Feb. 28, 1922

Fig. 1.

CUSTOMER'S CARD

This is to certify that

Mr. ..................................................... 6 has been granted an account with the MERCHANTS CREDIT
EXCHANGE of Waukesha, Wis., and is entitled to
receive credit ..................................................

Dated .............................        ........................... 7
                                            Credit Mgr.

Account Issued ............ 1922
Merchant's Credit Exchange
WAUKESHA, WIS.,

Remarks
_____
_____
10

Fig. 3.

11
                Waukesha, Wis., ............ 1922.
Mr ..................... 12

In Account With
Merchant's Credit Exchange
For Merchandise Received of
14 Smith's Department Store

| CUSTOMER | CLERK | AMOUNT |
|----------|-------|--------|
| No       |       |        |

Fig. 4.

No ...................
                                                Credit Limit ...............
15      Mr ..........................

In Account With
Merchant's Credit Exchange

Account for Month of ............ 1922

| DATE | MEMBER | DEBIT | CREDIT | BALANCE |
|------|--------|-------|--------|---------|
|      | 16     |       |        |         |

Inventor: Clarence L. Steinert
By
Attorneys

Patented Nov. 27, 1923.

1,475,896

UNITED STATES PATENT OFFICE.

CLARENCE L. STEINERT, OF WAUKESHA, WISCONSIN.

MEANS FOR PROMOTING RETAIL CREDIT.

Application filed February 28, 1922. Serial No. 540,045.

*To all whom it may concern:*

Be it known that I, CLARENCE L. STEINERT, a citizen of the United States, and resident of Waukesha, in the county of Waukesha and State of Wisconsin, have invented certain new and useful Improvements in Means for Promoting Retail Credit; and I do hereby declare that the following is a full, clear, and exact description thereof.

My invention relates to a new and improved retail credit system and its general object is to provide means for granting and conducting retail credits in a systematic, uniform manner, which will relieve retail merchants of the many disadvantages of their present credit methods and yet allow them to retain the advantages of allowing credit to their customers. By means of this invention, the cost to the merchants of installing and conducting this system, will be considerably less than the cost of their credit systems as at present conducted.

The principal object is that of conducting retail credits on a cooperative basis through a strong systematic organization, specializing in the business of conducting retail credits for the purpose of creating efficiency and economy in this important factor of the retail business.

The principles of my invention may be best explained with reference to the accompanying drawing, in which:

Figure 1 represents a customer's card, which is issued by an official of the central organization and entitles the customer to receive credit at any of the stores associated with the system.

Figure 2 represents a card which is issued to each one of the retail stores.

Figure 3 represents a sales slip, which is used in connection with the system, and Figure 4 represents a ledger sheet.

Referring more specifically to the drawing and to the manner in which the business is conducted, the individual desiring to obtain credit from any of the retail stores is referred to the office of the central organization, which in the present instance may be referred to as the Merchants' Credit Exchange. This bureau is organized for the purpose of investigating the prospective customer's credentials and if these are found to be satisfactory, a card, as indicated at 5, is issued to the applicant, whose name is inserted in the space 6, the card being signed, as indicated at 7, by the credit manager, who has investigated the proposed customer's references. Each one of the stores connected with the system is then furnished with a card 8 upon which is entered the customer's name, as shown at 9. This card is, also, provided with a space 10 for furnishing the necessary information to the merchant, such as the amount of credit which may be extended, etc. Usually, each customer will be given a number, which may be inserted in the space 13. The customer's card may, also, be provided with suitable rules and regulations, which may be printed on the back thereof.

When the customer makes a purchase, he presents his card, whereupon the merchant may ascertain from his own card system the genuineness of the credential. Upon making a sale, the clerk uses a sales slip 11, which is provided with a space 12 for the customer's name and a space 14 for the number of the customer's account. Other spaces are provided upon the sales slip of the same character as those customarily provided on similar slips.

On these sales slips, underneath the customer's name and address, will be the words "In account with the Merchants' Credit Exchange." Thus it will be understood that the customers are responsible to the Merchants' Credit Exchange for all goods received on credit from the individual stores.

Each day the merchants will take their original sales slips to the office of the Merchants' Credit Exchange and there receive a note for the amount of the slips less a small discount. The rate of discount will vary slightly according to the volume of business done by the merchants.

The notes, which are given to the different merchants, will be payable in about thirty-five or forty days from the time they are issued. This is the average length of time required to collect the accounts for which the notes are issued. Thus, each merchant furnishes the amount of capital required to carry his credit account. As the notes become due, they are redeemed by the Merchants' Credit Exchange and the merchants are paid in cash collected from the accounts covered by the notes. When the merchant delivers his sales slips each day to the Merchants' Credit Exchange, all responsibility for the accounts passes from him to the Merchants' Credit Exchange. The only restriction placed upon the merchant is that he shall not turn in any slips from customers who are not in good standing. The items are transferred from the sales slips to ledger sheets 15 which are provided with the usual forms 16.

A daily bulletin will be sent to each member of the system containing information as to new accounts issued and accounts discontinued, as well as any other advice or instructions which it is deemed advisable to issue to aid the merchant in conducting his business. By means of this system the merchants will conduct their entire business practically upon a cash basis, at a cost far less than the cost of their present credit system. The customer having once established his credit may use the same at any of the different stores without any further trouble. The efficient operation is assured since the entire matter of credits will be handled by persons who are experts in that line.

It will, also, be seen that if the plan is successful in one locality, it will undoubtedly be adopted in other localities. It is evident, therefore, that a national association of these credit exchanges may be established and operated upon a uniform basis, which would add considerable strength and prestige to each local exchange.

There would, also, be a considerable amount of cooperation possible between the credit exchanges of different localities. For example, Mr. Smith, who is an A-1 credit customer in one city is obliged to move to a distant city where he is unknown. He will go to the credit manager of the credit exchange in his home town and there secure a card transferring his credit account to the credit exchange in his new place of residence. The credit manager in the first city will mail a report of Mr. Smith's removal containing all necessary credit information, together with Mr. Smith's signature, to the credit manager in the second city. Upon Mr. Smith's arrival in the second city, he will present his transfer card to the credit manager in that city, who will compare his signature with the signature on the reoprt, which has been transferred by mail. This will prove Mr. Smith's identity and credit standing and he may then open his account in the second city without further questioning.

Through this cooperative relationship by means of the national association, not only is the granting of credit to customers in good standing facilitated, but "dead-beats" moving from one place to another may be more easily traced and located.

Through the efficient operation of a national association, each local credit exchange can profit by the adoption of improved methods discovered by other local branches of the exchange.

From the foregoing description of the working of my improved system, it will be seen that the merchants will derive the greatest direct benefit therefrom. It will place their entire business practically upon a cash basis at a cost to them of approximately one-half the cost of their present credit system. The customers will, also, benefit indirectly in accordance with the benefits derived by the merchants. Their accounts will be kept in a uniform and accurate manner, their monthly statements will be neatly and accurately prepared, the system will make credit easier for those deserving it, and it will establish franker and more cordial credit relations between customers and merchants.

Jobbers, manufacturers, and wholesalers will, also, benefit by the system, since the retail merchants business will be put on a better financial basis and his credit relations with the dealers from whom he purchases his supplies will be greatly improved.

While I have shown various forms and detailed indicia, which may be placed thereon, it will be understood that these details may be varied within the discretion of the organization without departing from the spirit of the invention.

I claim:—

In connection with a system for conducting retail credit, the combination of a customer's card having a designated space thereon for the signature of the official of a central credit bureau, and a designated space thereon for the customer's name, said card having words printed thereon indicating that said customer has an account with said official, a corresponding record card for each store having words printed thereon indicating that said customer is in account with said central credit bureau and having a designated space for the customer's name and a space for remarks, sales slips having a space for the customer's name and having words printed thereon indicating that said customer is in account with said central credit bureau, said record card and said slips having spaces for said customer's number, said sale slips having space and appropriate indicia and forms for recording the sales and appropriate sheets for the use of the credit bureau in combining the credits of the individual stores, said sheets having a designated space thereon for the customer's name and a designated space for the customer's number and words printed thereon indicating that said customer is in account with said central bureau, said sheets having appropriate indicia and forms for the debiting, crediting and balancing of amounts.

In testimony that I claim the foregoing I have hereunto set my hand at Waukesha, in the county of Waukesha and State of Wisconsin.

CLARENCE L. STEINERT.